No. 645,977. Patented Mar. 27, 1900.
C. J. SHIELDS.
HANDLE BAR FOR VELOCIPEDES.
(Application filed Sept. 16, 1899.)
(No Model.)
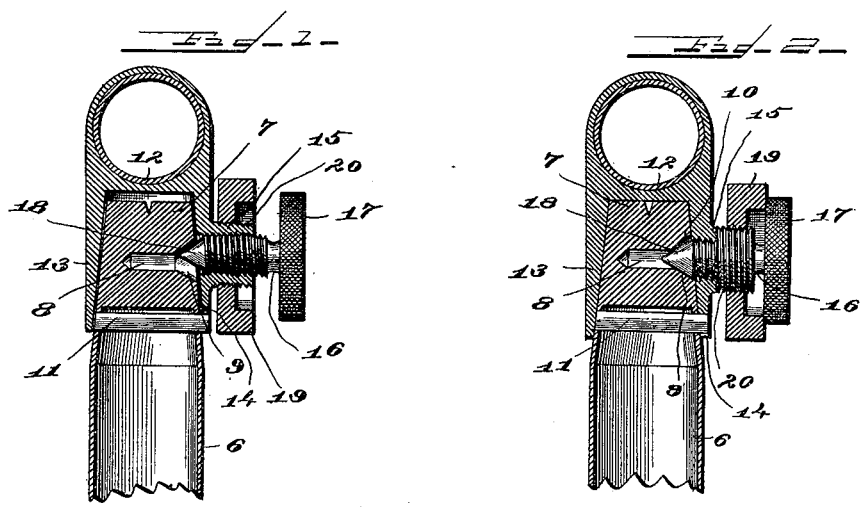
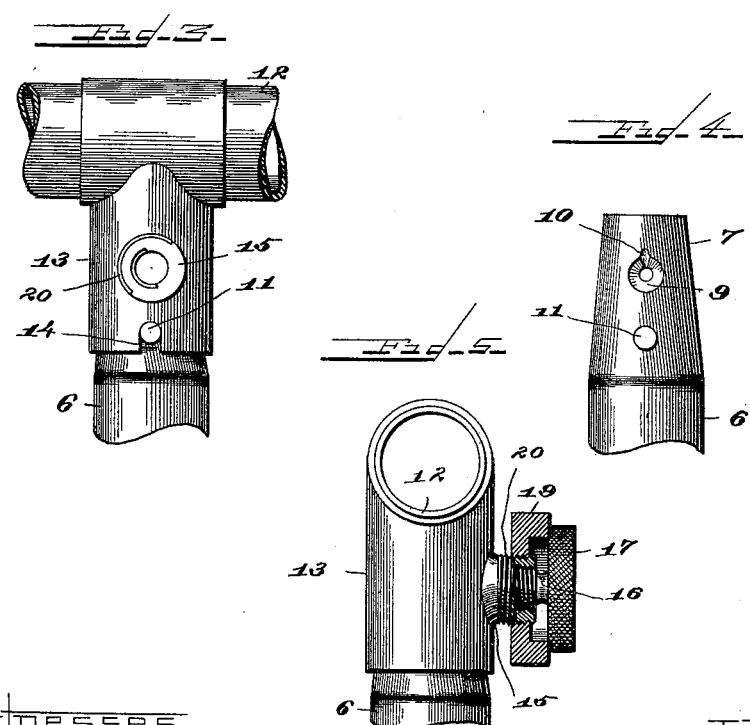

UNITED STATES PATENT OFFICE.

CHARLES J. SHIELDS, OF CHICAGO, ILLINOIS.

HANDLE-BAR FOR VELOCIPEDES.

SPECIFICATION forming part of Letters Patent No. 645,977, dated March 27, 1900.

Application filed September 16, 1899. Serial No. 730,763. (No model.)

*To all whom it may concern:*

Be it known that I, CHARLES J. SHIELDS, residing at Chicago, in the county of Cook and State of Illinois, have invented certain new and useful Improvements in Handle-Bars for Velocipedes, of which the following is a specification, reference being had to the accompanying drawings.

My invention relates to handle-bars for bicycles and other velocipedes; and has for its object to provide an improved removable handle-bar which will be so constructed that it may be readily detached from the steering-head or replaced thereon and secured firmly thereto.

To the ends stated my invention consists in the novel construction, arrangement, and operation of parts hereinafter set forth, and specified in the claim appended to the specification.

In the drawings, Figure 1 is a vertical section of the handle-bar and the upper part of the steering-head, showing the parts before the handle-bar is secured upon the steering-head. Fig. 2 is a similar view showing the parts in operative position. Fig. 3 is a view of the back of the steering-head and the handle-bar. Fig. 4 is a view of the upper end of the steering-head, showing the socket for the locking-screw and the guide-pin; and Fig. 5 is a view showing a modified arrangement of the lock-nut for the locking-screw.

Referring to the drawings for a detailed description of my improvements as therein illustrated, 6 indicates the steering-head of a bicycle or other velocipede which, as shown in Fig. 4, is provided with a taper portion 7 at its upper end. The upper end of the steering-head is provided with a plug or is otherwise made substantially solid, as shown in Fig. 1, and is provided with a socket 8, the outer portion of which is tapered, as shown at 9 in Figs. 1 and 4. At the upper side of the socket 8 a notch 10 is provided, which extends diagonally down into the socket 8, as shown in Fig. 4.

11 indicates a pin which projects from one side of the upper end of the steering-head, as shown in Figs. 1 and 2.

12 indicates the handle-bar, which in the construction shown is provided with a thimble 13, having a taper socket adapted to receive the taper plug 7 of the steering-head. The thimble 13 is provided with a notch 14, adapted to receive the pin 11, as shown in Fig. 3, and thereby insure the fitting together properly of the parts. The thimble 13 is provided at a point opposite the socket 8 with a boss 15, having a screw-threaded passage adapted to receive a locking-screw 16, as shown in Fig. 1. Said screw is provided with a head 17, by which it may be rotated, and with a tapered inner end 18, which is adapted to enter the socket 8, as shown in Figs. 1 and 2, and thereby firmly bind the thimble and the handle-bar upon the steering-head. The operation of the device is as follows: The locking-screw 16 being withdrawn from its socket sufficiently, the thimble 13 is placed upon the upper end of the steering-head and properly centered by the pin 11 entering the notch 14, as shown in Fig. 3. The locking-screw 16 is then moved inward, its point entering the notch 10 of the socket 8, as shown in Fig. 1. As the screw is forced inward the inclined notch 10 forces the steering-head up into the thimble or the thimble down upon the steering-head until the parts are finally brought firmly together, as shown in Fig. 2, when the point of the locking-screw lies in the inner portion of the socket 8. The handle-bar is thereby held firmly against vibration upon the steering-head, the parts being in effect one piece.

To prevent accidental loosening of the locking-screw, a lock-nut 19 is provided, which is mounted upon the screw-threads 20 on the outer surface of the boss 15. In Fig. 2 I have shown the screw-threads on the boss arranged the same as those of the locking-screw, so that the lock-nut is rotated from right to left in order to move it out into engagement with the head 17, as shown in Fig. 2. In Fig. 5 the screw-threads on the boss are oppositely arranged, so that the lock-nut is turned in the opposite direction to carry it out into engagement with the head 17. With either construction the lock-nut may be made to bear tightly against the head 17 and prevent its accidental rotation.

That which I claim as my invention, and desire to secure by Letters Patent, is—

The combination of a steering-head having a taper plug, a handle-bar having a thimble provided with a taper socket to receive said plug, a boss carried by said thimble, said boss having external and internal screw-threads, a locking-screw fitted in said boss, said screw having a head at its outer end, a lock-nut fitted on the screw-threads of said boss, and a lateral socket in said steering-head, said screw being adapted to register with said lateral socket, substantially as described.

CHARLES J. SHIELDS.

Witnesses:
JOHN L. JACKSON,
ALBERT H. ADAMS.